United States Patent
Hall et al.

(10) Patent No.: US 7,954,826 B2
(45) Date of Patent: Jun. 7, 2011

(54) DAMPER ACTUATED ACTIVE ROLL CONTROL

(75) Inventors: Everett Hall, Farmington Hills, MI (US); James Keane, West Bloomfield, MI (US); Jeffrey Lloyd, Auburn Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 763 days.

(21) Appl. No.: 11/764,265

(22) Filed: Jun. 18, 2007

(65) Prior Publication Data
US 2008/0309031 A1   Dec. 18, 2008

(51) Int. Cl.
*B60G 17/05* (2006.01)
(52) U.S. Cl. .................... 280/5.508; 280/5.501
(58) Field of Classification Search ............... 280/5.508, 280/5.501, 5.502
See application file for complete search history.

(56) References Cited

U.S. PATENT DOCUMENTS

| | | | |
|---|---|---|---|
| 3,197,233 A | 7/1965 | Van Winsen et al. | |
| 5,116,077 A * | 5/1992 | Karnopp et al. | 280/5.502 |
| 6,116,618 A * | 9/2000 | Shono et al. | 280/5.501 |
| 6,161,843 A | 12/2000 | Carleer | |
| 6,264,212 B1 * | 7/2001 | Timoney | 280/5.51 |
| 6,361,033 B1 | 3/2002 | Jones et al. | |
| 6,370,459 B1 | 4/2002 | Philips | |
| 2006/0287791 A1 | 12/2006 | Boon et al. | |

* cited by examiner

*Primary Examiner* — Eric Culbreth
(74) *Attorney, Agent, or Firm* — Carlson, Gaskey & Olds, PC

(57) ABSTRACT

A roll control system is provided that includes first and second dampers each having fluid. A pump fluidly interconnects the first and second dampers. A motor is connected to the pump. A controller is in communication with the motor. The controller is configured to command the motor to drive the pump and transfer fluid between the first and second actuators in a desired direction in response to a roll signal. The pump provides fluid from one of the first and second dampers to the other of the first and second dampers in response to being driven by the motor. The roll control system can be used on front and rear axles to provide improved overall stability for the vehicle. In one example, a common motor is used to drive first and second pumps, which are respectively associated with the front and rear axles.

20 Claims, 3 Drawing Sheets

DAMPER ACTUATED ACTIVE ROLL CONTROL

BACKGROUND

This disclosure relates to an active roll control system.

Roll control systems have been employed in vehicles to improve the lateral stability of the vehicle during cornering maneuvers, for example. One typical type of passive roll control system incorporates a stabilizer bar associated with an axle of the vehicle. The stabilizer bar prevents excessive lateral roll during vehicle operation. To enhance the performance and handling of vehicles, semi-active and active roll control systems have been used in conjunction with stabilizer bars.

Semi-active and active roll control systems are typically provided on higher end or luxury vehicles due to the high cost of the systems. To reduce the cost of the roll control system so that it can be incorporated in a greater number of vehicles, the roll control components have been incorporated to existing suspension components, such as fluid dampers. The dampers, or shock absorbers, extend between the suspension components that support the wheels and the vehicle body. However, previously proposed damper roll control systems have not provided a desired level of performance. Furthermore, the proposed damper roll control systems are rather complex and use many components making the system too costly.

What is needed is a roll control system having enhanced performance and reduced cost.

SUMMARY

A disclosed roll control system includes first and second dampers each having fluid. A pump fluidly interconnects the first and second dampers. A motor is connected to the pump. A controller is in communication with the motor. The controller is configured to command the motor to drive the pump and transfer fluid between the first and second actuators in a desired direction in response to a roll signal. The pump provides fluid from one of the first and second dampers to the other of the first and second dampers in response to being driven by the motor. In this manner, an active roll control system is incorporated into the dampers, which reduces its cost while providing enhanced performance.

The disclosed roll control system can be used on front and rear axles to provide improved overall stability for the vehicle. In one example, a common motor is used to drive first and second pumps, which are respectively associated with the front and rear axles.

These and other features of the application can be best understood from the following specification and drawings, the following of which is a brief description.

DETAILED DESCRIPTION

Figure 1:
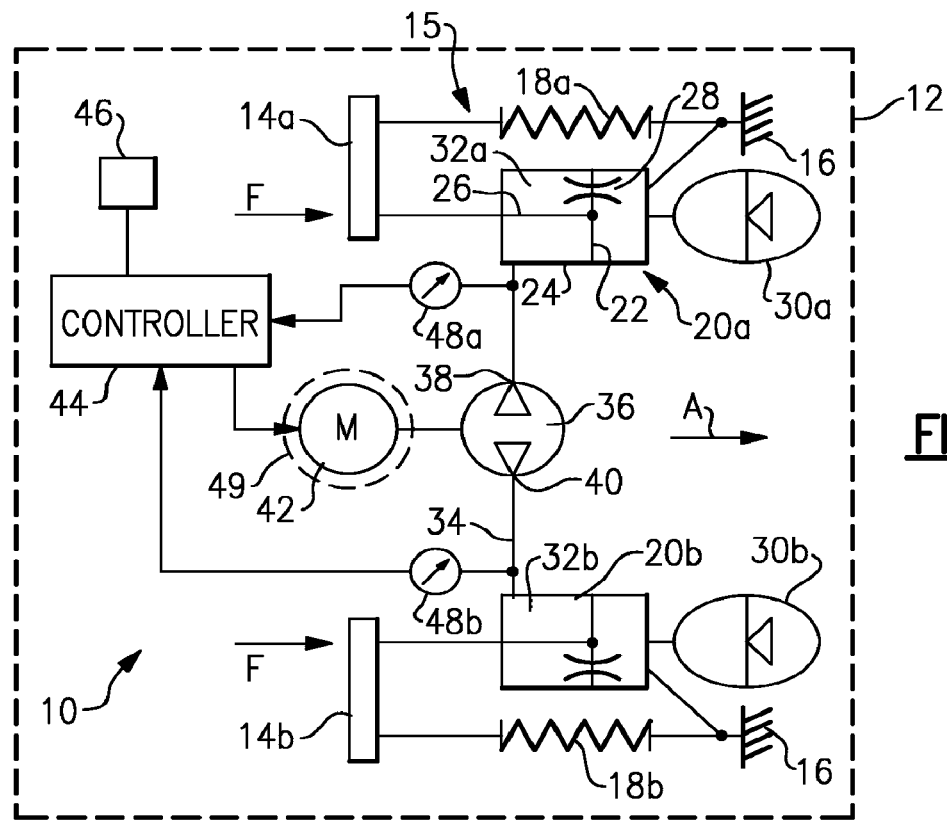
FIG. 1 is a schematic view of an example damper actuated active roll control system for a vehicle.

A schematic view of a damper roll control system 10 is shown in FIG. 1. The damper roll control system 10 is used in a vehicle 12 to improve the vehicle's overall stability, including lateral stability during vehicle turning maneuvers.

The vehicle 12 includes a first axle 15 supporting wheels 14a, 14b where the vehicle 12 is moving forward in a direction indicated by arrow A. In one example, the wheels 14a, 14b are left-front and right-front wheels with the left-front wheel 14a being above the right front wheel 14b pictorially in FIG. 1 as the vehicle moves forward. The term "axle" should be understood as including arrangements other than a solid axle. For example, the axle may be provided by an independent McPherson strut arrangement, control arm or independent suspension links in which there is no single axle that extends between the wheels 14a, 14b.

Springs 18a, 18b extend between the wheels 14a, 14b and the body of frame 16 of the vehicle 12. First and second dampers 20a, 20b respectively extend between the axle 15 and frame 16 and parallel to the springs 18a, 18b, for example. The first and second dampers 20a, 20b each include a piston 22 arranged within a cylinder 24. A rod 26 extends from the piston 22, as is known in the art. The piston 22 includes a valve 28 that selectively permits fluid to flow between chambers within the cylinder 24 on either side of the piston 22 to provide damping from input forces F transmitted from the wheels 14a, 14b to the frame 16. In the example, accumulators 30a, 30b are respectively in fluid communication with each of the first and second dampers 20a, 20b to receive excess fluid.

The first and second dampers 20a, 20b are used to provide enhanced stability and roll control to the vehicle 12 during vehicle maneuvers as well as the traditional damping function described above. A fluid conduit 34 fluidly interconnects first chambers 32a, 32b respectively associated with the first and second dampers 20a, 20b. A first pump 36, which is bidirectional in one example, is fluidly connected to the fluid conduit 34 to pump fluid between the first chambers 32a, 32b. The first pump 36 includes first and second outputs 38, 40 respectively associated with the first and second dampers 20a, 20b. In one example, a first motor 42, which can be a servomotor, drives the first pump 36 in a desired direction. Specifically, fluid is transferred from one of the first and second dampers 20a, 20b to the other depending on the roll condition to stabilize the vehicle 12 during turning maneuvers, for example. For example, the first motor 42 will drive the first pump 36 in a first direction to pump fluid from the first chamber 32b through the second output 40 and out the first output 38 into the first chamber 32a to prevent excessive roll on the side of the vehicle having the first damper 20a.

A controller 44 is in communication with the first motor 42. The controller 44 receives a roll signal from a roll sensor 46 when an undesired roll condition exists. The controller 44 commands the first motor 42 to drive the first pump 36 in a desired direction in response to the roll signal to stabilize the vehicle 12. In this manner, the damper roll control system 10 actively stabilizes the vehicle 12 and minimizes undesired roll conditions.

To provide improved overall control of the damper roll control system 10, pressure sensors 48a and 48b are associated with the first and second outputs 38, 40 to provide feedback to the controller 44. The controller 44 controls the first motor 42 and first pump 36 to achieve a desired differential pressure between the first and second dampers 20a, 20b via the first chambers 32a, 32b in a closed-loop controlled manner.

In the event of a system failure, it is desirable to provide a failsafe condition so that fluid is prevented from flowing between the first and second dampers 20a, 20b, which would reduce the roll stability of the vehicle 12. In one example, a brake 49 is associated with the first motor 42 to brake the motor 42 which in turn prevents rotation of the first pump 36, effectively hydraulically locking the first pump 36 to prevent transfer of fluid between the first and second dampers 20a, 20b. The brake 49 is commanded by a controller 44 in a failure condition.

Figure 2:
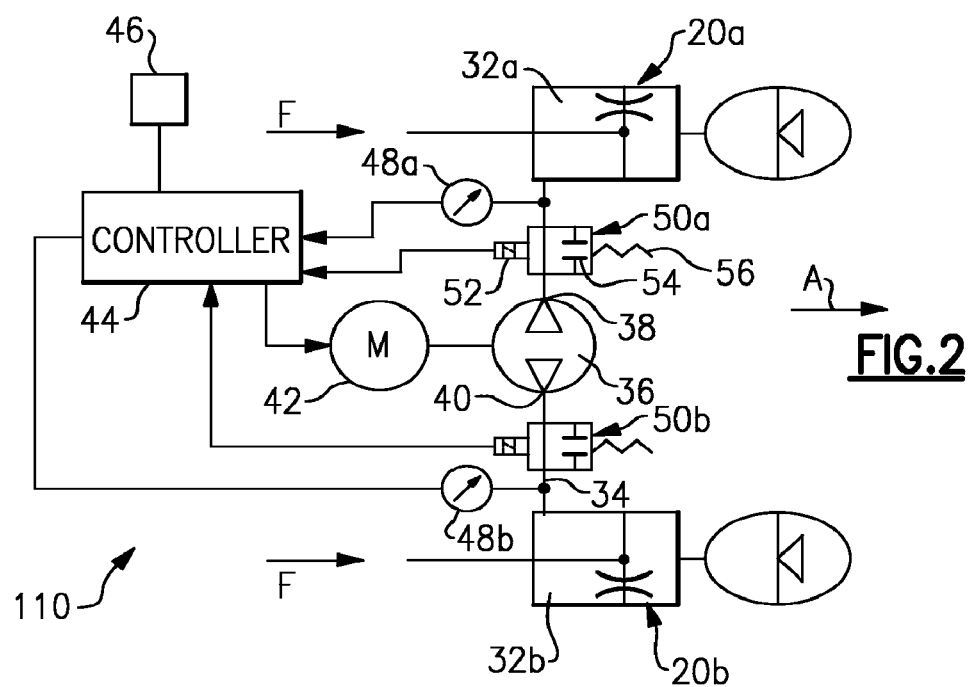
FIG. 2 is a schematic view of the roll control system generally shown in FIG. 1 with a failsafe valve.

A similar damper roll control system 110 is shown in FIG. 2. However, an additional and/or alternative failsafe is used. In the example shown, a failsafe valve 50a, 50b is arranged respectively between the first and second outputs 38, 40 and the first and second dampers 20a, 20b. The failsafe valves 50a, 50b each include a valve 54 biased to a normally closed position by a spring 56. A solenoid 52 is in communication with the controller 44. The solenoid 52 is commanded to open the valve 54 to an open position when the first motor 42 drives the first pump 36 to transfer fluid between the first and second dampers 20a, 20b during a roll condition. In the event of a failure, the spring 56 biases the valve 54 to the closed position preventing transfer of fluid between the first and second dampers 20a, 20b in a failure condition.

Figure 3:
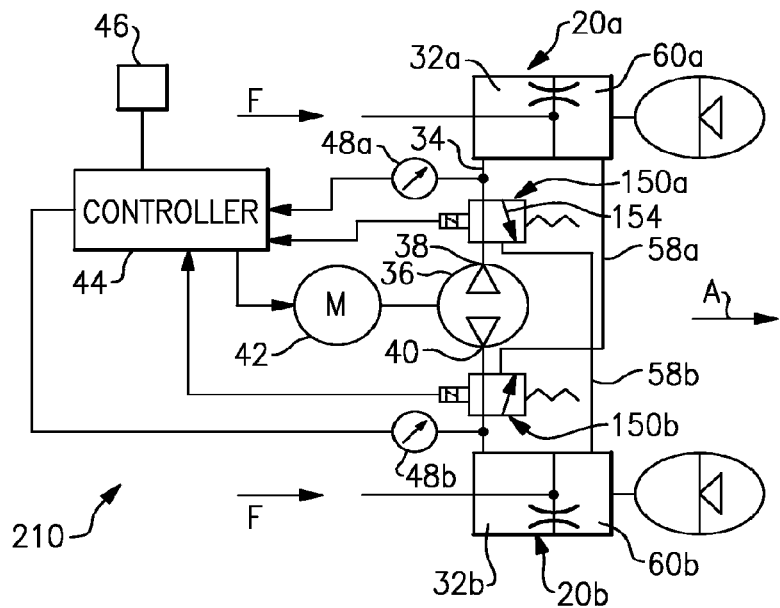
FIG. 3 is a schematic view of the roll control system generally shown in FIG. 2 with cross conduits interconnecting chambers of the dampers.

Another example damper roll control system 210 is shown in FIG. 3, which is similar to the damper roll control system 110 shown in FIG. 2. The damper roll control system 210 additionally incorporates cross conduits 58a, 58b to fluidly connect the opposite chambers of the first and second dampers 20a, 20b in the event of a failure to equalize the fluid between the first and second dampers 20a, 20b so that the vehicle 12 does not stay in a tilted and potentially unstable position subsequent to a failure. Specifically, the first chamber 32a of the first damper 20a is fluidly connected to a second chamber 60b of the second damper 20b through the failsafe valve 150a when the valve 154 is biased to the closed position by the spring 156. Similarly, the first chamber 32b of the second damper 20b is fluidly connected to a second chamber 60a of the first damper 20a through the failsafe valve 150b when in the closed position.

Figure 4:
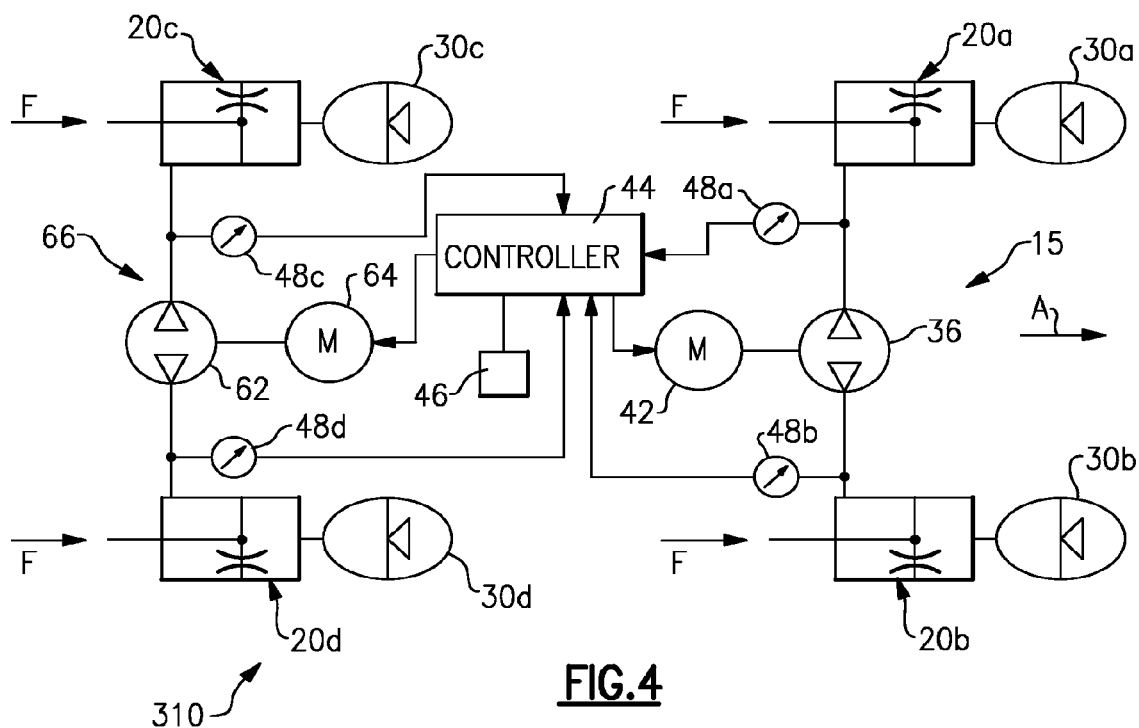
FIG. 4 is a schematic view of the roll control system generally shown in FIG. 1 utilized on both front and rear axles.

An example four wheel damper roll control system 310 is shown in FIG. 4. The damper roll control system 310 includes a second axle 66 having third and fourth dampers 20c, 20d associated therewith. In the example shown, the third and fourth dampers 20c, 20d respectively include associated accumulators 30c, 30d and pressure sensors 48c, 48d. A second pump 62 is driven by a second motor 64, which is in communication with the controller 44. The first and second motors 42, 64 can independently drive the first and second pumps 36, 62 to provide different roll control to the first and second axles 15, 66, if desired.

Figure 5:
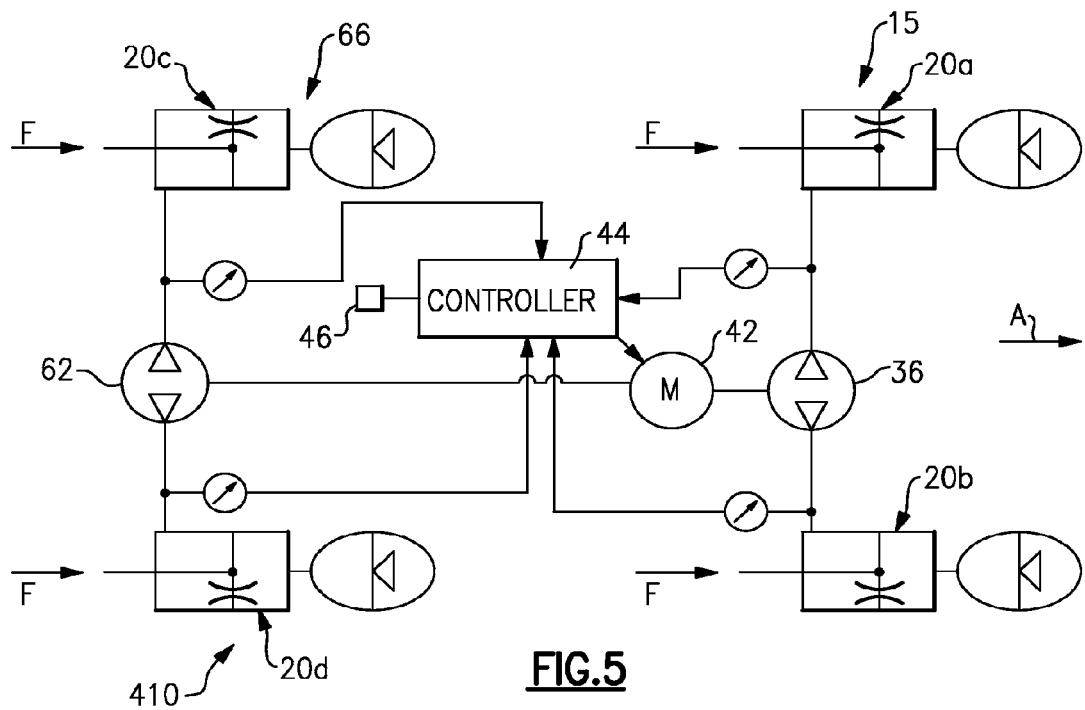
FIG. 5 is a schematic view of the roll control system generally shown in FIG. 4 with a common motor driving first and second pumps.
Figure 6:
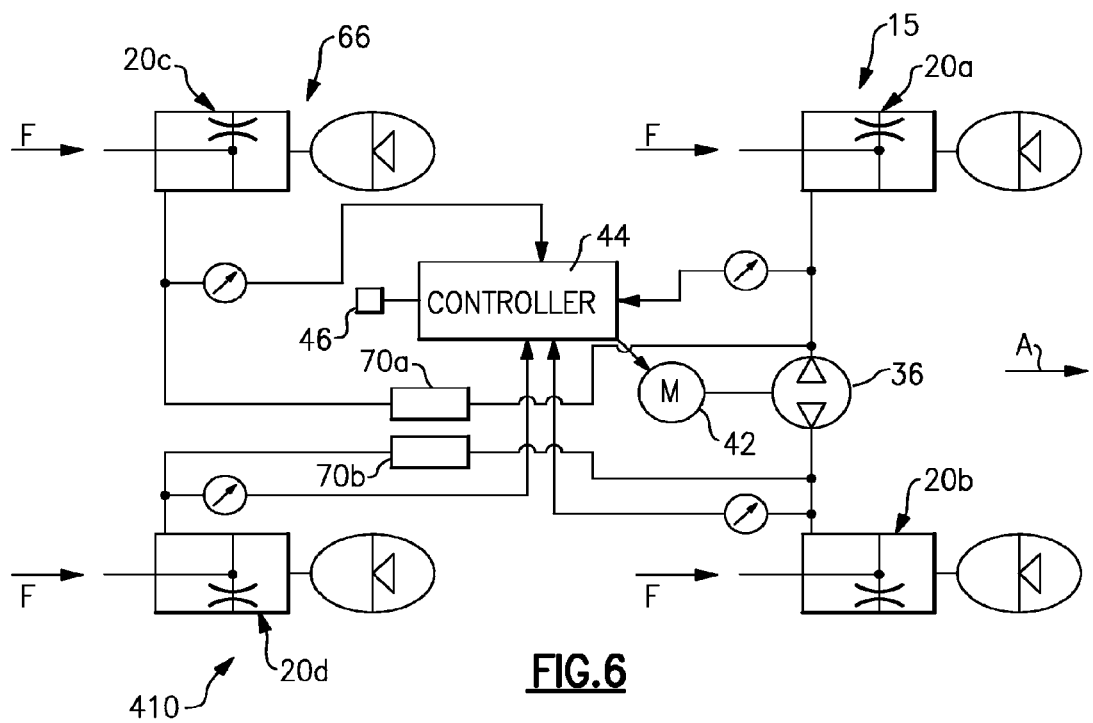
FIG. 6 is a schematic view of the roll control system generally shown in FIG. 5 with a common pump.

To reduce the components and expense associated with the damper roll control system 310, the first motor 42 can be used to drive both the first and second bidirectional pumps 36, 62 as illustrated in the damper roll control system 410 in FIG. 5. Referring to FIG. 6, the first motor 42 can be used to drive first bidirectional pump 36, which is common to the first and second axles 15, 66. Proportioning valves 70a, 70b, for example, are respectively arranged between each side of the first and second axles 15, 66 to throttle fluid flow from the first bidirectional pump 36 to the rear axle (second axle 66). Other variable or fixed fluid flow devices can be used to throttle the fluid flow.

Although example embodiments have been disclosed, a worker of ordinary skill in this art would recognize that certain modifications would come within the scope of the claims. For that reason, the following claims should be studied to determine their true scope and content.

What is claimed is:

1. A roll control system comprising:
   first and second dampers each having fluid;
   a pump fluidly interconnected between the first and second dampers;
   a motor connected to the pump; and
   a controller in communication with the motor, the controller configured to command the motor to drive the pump in response to a roll signal, the pump providing fluid from one of the first and second dampers to the other of the first and second dampers in a desired direction in response to being driven by the motor, and wherein the controller controls the motor in response to sensed pump feedback to provide a closed-loop system.

2. The roll control system according to claim 1 comprising a suspension, the suspension including the first and second dampers, the first and second dampers configured to receive input forces from wheels.

3. The roll control system according to claim 2, wherein each of the first and second dampers includes a piston arranged within a cylinder, and a rod extending from the piston through the cylinder, the piston separating the cylinder into first and second chambers, the pump transferring fluid from one of the first and second chambers of the first damper to one of the first and second chambers of the second damper.

4. The roll control system according to claim 1, wherein each of the first and second dampers includes an accumulator in fluid communication therewith.

5. The roll control system according to claim 1 comprising a roll sensor in communication with the controller, the roll sensor providing the roll signal.

6. The roll control system according to claim 1 comprising a brake associated with the motor, the brake in communication with the controller and configured to prevent movement of the pump in response to a command from the controller in a failure condition.

7. The roll control system according to claim 1 comprising a failsafe valve in fluid communication with the pump, the failsafe valve configured to prevent transfer of fluid between the first and second dampers in response to a command from the controller in a failure condition.

8. The roll control system according to claim 7, wherein the failsafe valve includes a valve biased to a closed position by a spring, and a solenoid in communication with the controller, the solenoid commanded to open the valve to permit transfer of fluid between the first and second dampers in response to the roll signal.

9. The roll control system according to claim 8 comprising first and second cross conduits fluidly respectively connecting opposite first and second chambers of the first and second dampers in the closed position.

10. The roll control system according to claim 1 comprising third and fourth dampers and a second pump fluidly interconnected between the third and fourth dampers for selectively transferring fluid between the third and fourth dampers.

11. The roll control system according to claim 10 comprising a second motor connected to the second pump, the controller in communication with the second motor and configured to drive the second pump in another desired direction in response to the roll signal.

12. The roll control system according to claim 1, wherein each of the first and second dampers includes a piston arranged within a cylinder, and a rod extending from the piston through the cylinder, the piston separating the cylinder into first and second chambers, and including a fluid conduit interconnecting at least one of the first and second chambers of the first damper to at least one of the first and second chambers of the second damper, and wherein the pump is fluidly connected to the fluid conduit and includes a first output associated with the first damper and a second output associated with the second damper with the motor driving the pump to transfer fluid from the one of the first and second chambers of the first damper via the first output to the one of the first and second chambers of the second damper via the second output in response to the roll signal.

13. A roll control system comprising:
first and second dampers each having fluid;
a pump fluidly interconnected between the first and second dampers wherein the pump includes first and second outputs;
a pressure sensor in communication with each of the first and second outputs;
a motor connected to the pump; and
a controller in communication with the motor and the pressure sensors communicating with the controller, which is configured to provide pressure feedback for achieving a desired pressure differential between the first and second dampers, the controller configured to command the motor to drive the pump in response to a roll signal, the pump providing fluid from one of the first and second dampers to the other of the first and second dampers in a desired direction in response to being driven by the motor.

14. A roll control system comprising:
a plurality of dampers including at least a first damper and a second damper each having fluid wherein the first damper is associated with a first wheel and the second damper is associated with a second wheel;
a fluid conduit interconnecting the first and second dampers;
at least one pump fluidly connected to the fluid conduit to transfer fluid between the first and second dampers;
at least one motor connected to the at least one pump; and
a controller in communication with the motor, the controller configured to command the motor to drive the pump in response to a roll signal, the pump providing fluid from one of the first and second dampers to the other of the first and second dampers in a desired direction in response to being driven by the motor wherein the controller controls the motor in response to sensed pump pressure feedback to provide a closed-loop system.

15. The roll control system according to claim 14 wherein the plurality of dampers includes a first set comprising the first and second dampers and includes a second set comprising third and fourth dampers;
wherein the at least one pump comprises at least first and second pumps respectively fluidly interconnected to the first and second sets;
wherein the at least one motor comprises a common motor connected to the first and second pumps; and
wherein the first and second pumps respectively provide fluid between the first and second dampers and between the third and fourth dampers in desired directions in response to being driven by the motor.

16. The roll control system according to claim 15 comprising front and rear axles corresponding to the first and second sets.

17. The roll control system according to claim 14 including at least one spring associated with each of the first and second wheels, the springs operating independently of the first and second dampers.

18. The roll control system according to claim 14, wherein each of the first and second dampers includes a piston arranged within a cylinder, and a rod extending from the piston through the cylinder, the piston separating the cylinder into first and second chambers, and wherein the fluid conduit interconnects at least one of the first and second chambers of the first damper to at least one of the first and second chambers of the second damper, and wherein the pump includes a first output associated with the first damper and a second output associated with the second damper with the motor driving the pump to transfer fluid from the one of the first and second chambers of the first damper via the first output to the one of the first and second chambers of the second damper via the second output in response to the roll signal.

19. The roll control system according to claim 18, wherein the plurality of dampers includes at least third and fourth dampers and including a second pump fluidly interconnected between the third and fourth dampers for selectively transferring fluid between the third and fourth dampers.

20. The roll control system according to claim 19 including a second motor connected to the second pump, the controller in communication with the second motor and configured to drive the second pump in another desired direction in response to the roll signal, the controller driving the first and second motors independently of each other.

* * * * *